(12) United States Patent
Terada et al.

(10) Patent No.: US 7,575,812 B2
(45) Date of Patent: Aug. 18, 2009

(54) CLEANING SUBSTRATE OF SUBSTRATE PROCESSING EQUIPMENT AND HEAT RESISTANT RESIN PREFERABLE THEREFOR

(75) Inventors: Yoshio Terada, Ibaraki (JP); Hirofumi Fujii, Ibaraki (JP); Makoto Namikawa, Ibaraki (JP); Daisuke Uenda, Ibaraki (JP); Yasuhiro Amano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 640 days.

(21) Appl. No.: 11/252,800

(22) Filed: Oct. 19, 2005

(65) Prior Publication Data

US 2006/0141258 A1    Jun. 29, 2006

(30) Foreign Application Priority Data

Oct. 19, 2004 (JP) .......................... P.2004-304027
Oct. 12, 2005 (JP) .......................... P.2005-297735

(51) Int. Cl.
  *B32B 27/06*   (2006.01)
  *B32B 7/12*    (2006.01)
  *B08B 7/00*    (2006.01)

(52) U.S. Cl. .......................... 428/473.5; 134/4; 134/6; 134/8; 428/343; 428/355 N

(58) Field of Classification Search .............. 428/473.5, 428/343, 355 N; 134/4, 6, 8
See application file for complete search history.

(56) References Cited

U.S. PATENT DOCUMENTS 4,929,716 A * 5/1990 Tyrell et al. ................. 528/353

FOREIGN PATENT DOCUMENTS

| CA | 2 346 634 A1 | 4/2000 |
| CN | 1328588 A | 12/2001 |
| JP | 5-170901 A | 7/1993 |
| JP | 6-73178 A | 3/1994 |
| JP | 6-207024 A | 7/1994 |
| JP | 2001-351960 A | 12/2001 |
| JP | 2002-18377 A | 1/2002 |
| JP | 2002-50854 A | 2/2002 |

OTHER PUBLICATIONS

Chinese Office Action dated Nov. 23, 2007.

* cited by examiner

*Primary Examiner*—D. S Nakarani
(74) *Attorney, Agent, or Firm*—Sughrue Mion, PLLC

(57) ABSTRACT

The present invention provides a cleaning substrate of a substrate processing equipment, which comprises a cleaning layer comprising a heat resistant resin with a storage modulus (1 Hz) at 20° C. up to 150° C. being $5 \times 10^7$ Pa to $1 \times 10^9$ Pa on at least one face of the substrate; and a polyimide resin suitable as the heat resistant resin for the cleaning layer and usable under circumstances possibly involving the generation of serious disadvantages due to silicone contamination, such as for HDD application and some semiconductor applications.

11 Claims, No Drawings

CLEANING SUBSTRATE OF SUBSTRATE PROCESSING EQUIPMENT AND HEAT RESISTANT RESIN PREFERABLE THEREFOR

FIELD OF THE INVENTION

The present invention relates to a cleaning substrate of a substrate processing equipment and also relates to a heat resistant resin preferable as the cleaning layer of the cleaning substrate.

BACKGROUND ART

Lowly elastic polyimide is used as a material with low stress and thermal resistance in protective films for use in semiconductors, insulation films of multilayer circuit substrates, adhesive films of semiconductors, cover lays of flexible circuit substrates and the like (see patent documents 1, 2, 3, 4 and 5).

Because such polyimide with low elasticity is obtained by the copolymerization of silicone-containing diamine or tetracarboxylic anhydride, however, such polyimide has never been possibly used for applications involving the generation of serious disadvantages due to silicone contamination, such as HDD application and some semiconductor applications.

As described above, heat resistant resins with low elasticity, being usable with no generation of contamination in production apparatuses of HDD and semiconductors, have been desired.

Further, some cleaning substrates for the dusting of the inside of such apparatuses contain sheets comprising synthetic resins such as acrylic resin on silicone wafer (see patent documents 6 and 7), However, it cannot be said that the thermal resistance of such substrates at the pre-processing step demanding thermal resistance in particular is satisfactory. Therefore, a highly thermally resistant cleaning substrate has been desired.

Particularly, the dusting wafer in the first-half process of producing semiconductor apparatuses, particularly PVD apparatus is frequently used at high temperature. Therefore, various physical properties such as thermal resistance within a temperature range for the dust proofing of these apparatuses and stability are now demanded,

[Patent document 1] JP-A-5-170901
[Patent document 2] JP-A-6-73178
[Patent document 3] JP-A-6-207024
[Patent document 4] JP-A-6-73178
[Patent document 5] JP-A-2002-50854
[Patent document 6] JP-A-2001-351960
[Patent document 7] JP-A-2002-18377

SUMMARY OF THE INVENTION

In accordance with the invention, a cleaning substrate of a substrate processing equipment such as semiconductor apparatus is provided, which has good cleaning ability in addition to great properties such as transferability and time period required for achieving vacuum. In accordance with the invention, additionally, a novel heat resistant resin is provided, which is preferably used as the cleaning substrate and is also usable under circumstances possibly involving the generation of serious disadvantages due to silicone contamination, such as for HDD application and some semiconductor applications.

The problems have been achieved by the following constitutions.

(1) A cleaning substrate of a substrate processing equipment, which comprises a cleaning layer comprising:

a substrate, and a heat resistant resin with a storage modulus (1 Hz) at 20° C. up to 150° C. being $5 \times 10^7$ Pa to $1 \times 10^9$ Pa on at least one face of the substrate.

(2) The cleaning substrate of a substrate processing equipment according to the above (1), wherein the heat resistant resin is a heat resistant resin obtained by polymerizing together tetracarboxylic dianhydride and a compound at least containing a polyether structure and having at least two terminal amine structures as a diamine component (sometimes referred to as heat resistant resin A hereinafter).

(3) The cleaning substrate of a substrate processing equipment according to the above (2), wherein the compound containing a polyether structure and having at least two terminal amine structures is a compound represented by the formula (1):

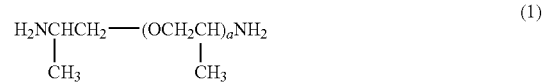

wherein a represents an integer of 2 or more.

(4) The cleaning substrate of a substrate processing equipment according to the above (2), wherein the heat resistant resin is a heat resistant resin having a structure unit represented by the following formula (R1):

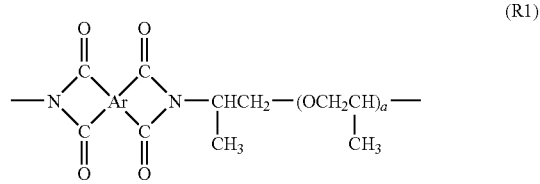

wherein a represents an integer of 2 or more, Ar represents a structure containing at least one aromatic ring.

(5) The cleaning substrate of a substrate processing equipment according to the above (2), wherein the compound containing a polyether structure and having at least two terminal amine structures is a compound represented by the formula (2):

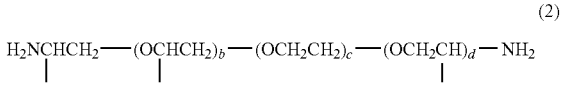

wherein b, c and d each independently represents an integer of 0 or more, provided that b+c+d is 2 or more.

(6) The cleaning substrate of a substrate processing equipment according to the above (2), wherein the heat resistant resin is a heat resistant resin having a structure unit represented by the formula (R2):

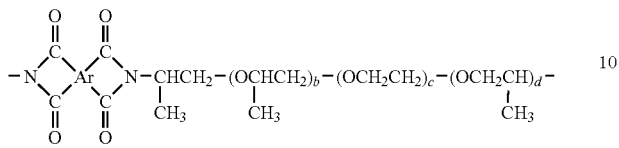
(R2)

wherein b, C and d each independently represents an integer of 0 or more, provided that b+c+d is 2 or more. Ar represents a structure containing at least one aromatic ring.

(7) The cleaning substrate of a substrate processing equipment according to the above (2), wherein the compound containing a polyether structure and having at least two terminal amine

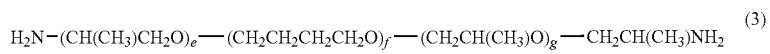
(3)

wherein e, f and g each independently represents an integer of 0 or more, provided that e+f+g is 2 or more.

(8) The cleaning substrate of a substrate processing equipment according to the above (2), wherein the heat resistant resin is a heat resistant resin having a structure unit represented by the formula (R3);

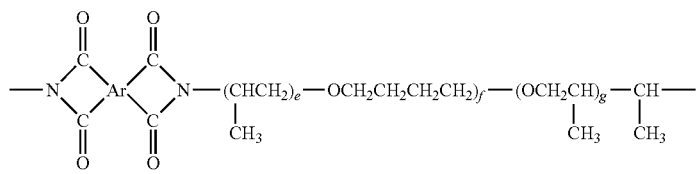
(R3)

wherein e, f and g each independently represents an integer of 0 or more, provided that e+f+g is 2 or more. Ar represents a structure containing at least one aromatic ring.

(9) The cleaning substrate of a substrate processing equipment according to the above (2), wherein the compound containing a polyether structure and having at least two terminal amine structures is a compound represented by the formula (4):

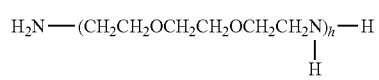
(4)

wherein h represents an integer of 1 or more.

(10) The cleaning substrate of a substrate processing equipment according to the above (2), wherein the heat resistant resin is a heat resistant resin having a structure unit represented by the formula (R4):

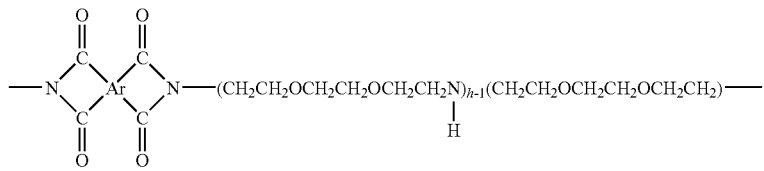
(R4)

wherein h represents an integer of 1 or more. Ar represents a structure containing at least one aromatic ring,

(11) A method for dusting the surface of a substrate processing equipment, which comprises putting the resin face of a cleaning substrate according to any one of the above (1) to (10) in contact to the surface of the substrate processing equipment.

Specifically, the invention provides the following heat resistant resins.

(12) A heat resistant resin obtained by polymerizing together tetracarboxylic dianhydride and a compound at least containing a polyether structure and having at least two terminal amine structures as a diamine component (heat resistant resin A).

(13) A heat resistant resin according to the above (12), wherein the compound containing a polyether structure and having at least two terminal amine structures is a compound represented by the formula (1).

(14) A heat resistant resin having a structure unit represented by the formula (R1).

(15) A heat resistant resin according to the above (12), wherein the compound containing a polyether structure and having at least two terminal amine structures is a compound represented by the formula (2).

(16) A heat resistant resin having a structure unit represented by the formula (R2).

(17) A heat resistant resin according to the above (12), wherein the compound containing a polyether structure and having at least two terminal amine structures is a compound represented by the formula (3).

(18) A heat resistant resin having a structure unit represented by the formula (R3).

(19) A heat resistant resin described above in (12), where the compound containing a polyether structure and having at least two terminal amine structures is a compound represented by the formula (4).

(20) A heat resistant resin having a structure unit represented by the formula (R4).

The cleaning substrate of a substrate processing equipment in accordance with the invention is effective for cleaning the inside of semiconductor apparatuses, particularly semiconductor apparatuses in high vacuum, which enables efficient cleaning of such apparatuses in a short period of time without any decrease of the vacuum degree of the inside of these semiconductor apparatuses or by allowing the inside thereof to more rapidly-resume the vacuum degree.

The heat resistant resin described above in the above (1) is useful as a cleaning layer for use in the cleaning substrate of a substrate processing equipment such as semiconductor apparatus. The use of the heat resistant resin enables the production of a dust-proofing wafer usable with a wider temperature range, for example for the dust proofing in the first-half process of producing semiconductor apparatuses.

Additionally, the heat resistant resin A can be used as a highly thermoresistant polyimide with low stress and small elastic modulus for applications involving the generation of serious disadvantages due to silicone contamination, for example HDD application and semiconductor application.

DETAILED DESCRIPTION OF THE INVENTION

In accordance with the invention, it has been found that a cleaning substrate including a cleaning layer comprising a heat resistant resin with a storage modulus (1 Hz) at 20° C. up to 150° C. being $5 \times 10^7$ Pa to $1 \times 10^9$ Pa on at least one face of the substrate has excellent properties capable of overcoming the problems described above.

The storage modulus (1 Hz) at 20° C. up to 150° C. is preferably $8 \times 10^7$ Pa to $8 \times 10^8$ Pa and particularly preferably $1 \times 10^8$ Pa to $6 \times 10^8$ Pa.

The heat resistant resin for use as the cleaning layer includes for example ladder polymers such as phenyl-T, polyquinoxaline, and polybenzoylene benziiidazole, and aromatic polymers such as polyphenylene, polyamide, polyester iride, polybenzimidazole, polycarbodiimide and aramid.

Particularly, polyimide, polyamide and polycarbodiimide are preferable as the cleaning layer since these never generate volatile gases or decomposition monomers even when these are exposed to high temperature of 400° C. or higher.

Additionally, it is found that in accordance with the invention, the heat resistant resin is preferably a novel polyimide resin (heat resistant resin A) obtained by polymerizing together tetracarboxylic dianhydride and a compound at least containing a polyether structure comprising for example an alkylene oxide and having at least two terminal amine structures as a diamine component.

Herein, the polyimide resin encompasses an imide resin with formed imide bond and polyamic acid without imidization as the precursor of such imide resin.

The heat resistant resin A is preferably used not only as the cleaning layer of the cleaning substrate but also as a highly thermoresistant polyimide resin with low stress and small elastic modulus for applications involving the generation of serious disadvantages due to silicone contamination, for example HDD application and semiconductor application.

(Compound Containing Polyether Structure and Having at Least Two Terminal Amine Structures)

In accordance with the invention, the diamine component for use in the synthesis of the heat resistant resin A is a compound containing a polyether structure and having at least two termini with amine structures (referred to as PE diamine compound hereinafter). The use of such PE diamine compound enables the production of a highly thermoresistant polyimide resin with low stress and small elastic modulus.

Any PE diamine compound containing a polyether structure and having at least two termini with amine structures is satisfactory with no specific limitation and preferably includes for example PE diamine compounds having two termini with amine structures prepared from ethylene oxide, propylene oxide, polytetramethylene glycol, polyamine or a mixture thereof.

The polyether structure in the PE diamine compound is a structure with two or more alkyleneoxy groups represented by —A—O—. A represents an alkylene group. O represents an oxygen atom.

The alkylene group as "A" has generally one to 10 carbon atoms, preferably 2 to 5 carbon atoms and includes for example methylene, ethylene, propylene and butylene.

Plural such alkyleneoxy groups may be the same or different. Additionally, the alkylene group as A may have substituents (for example, methyl group, polyether group and aminopolyether group).

The mass weight of the polyether structure in the PE diamine compound is generally 50% or more, preferably 70% or more.

The amine structures at the two termini of the FE diamine compound may be the same or different. Any primary through tertiary amine structures may be satisfactory. Preferably, the amine structures are primary.

The amine structures include for example methylamine, ethylamine and propylamine. Preferably, the amine structures are propylamine.

The number average molecular weight of the PE diamine compound is 200 to 5,000, preferably 600 to 4,000.

The PE diamine compound includes for example compounds represented by the formulas (1) to (4).

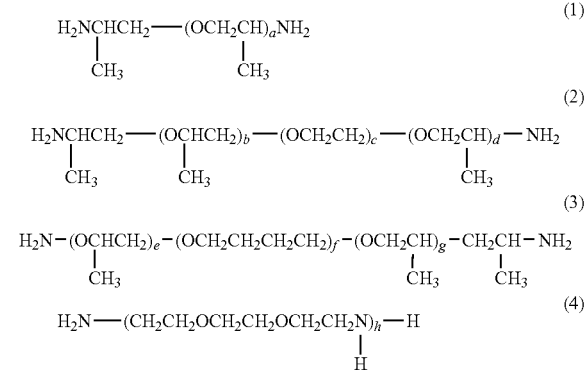

In the formula (1), a represents an integer of 2 or more and is preferably 5 to 80.

In the formula (2), b, c and d each independently represents an integer of 0 or more, provided that the sum (b +c+d) is 2 or more, preferably 5 to 50.

In the formula (3), e, f and g each independently represents an integer of 0 or more, provided that the sum (e +f+g) is 2 or more, preferably 5 to 30.

In the formula (4), h represents an integer of 1 or more, preferably 1 to 4.

The PE diamine compound can be synthetically prepared by known methods. Additionally, commercially available such compounds may be used satisfactorily.

For reaction with tetracarboxylic dianhydride, another diamine compound without any polyether structure may preferably be used in combination with the PE diamine compound as the diamine compound. The diamine compound preferable for use in combination includes for example such aliphatic diamines and aromatic diamines as described below.

(Aliphatic Diamines)

Aliphatic diamines include for example ethylenediamine, hexamethylenediamine, 1,8-diaminooctane, 1,10-diaminodecane, 1,12-diaminododecane, 4,9-dioxa-1,12-diaminododecane, and 1,3-bis(3-aminopropyl)-1,1,3,3-tetramethyldisiloxane.

The molecular weight of such aliphatic diamines is generally 50 to 1,000, and preferably 100 to 300.

(Aromatic Diamines)

The aromatic diamines include for example 4,4'-diaminodiphenyl ether, 3,4'-diaminodiphenyl ether, 3,3'-diaminodiphenyl ether, m-phenylenediamine, p-phenylenediamine, 4,4'-diaminodiphenylpropane, 3,3'-diaminodiphenylpropane, 4,4'-diaminodiphenylmethane, 3,3'-diaminodiphenylmethane, 4,4'-diaminodiphenylsulfide, 3,3'-diaminodiphenylsulfide, 4,4'-diaminodiphenylsulfone, 3,3'-diaminodiphenylsulfone, 1,4-bis(4-aminophenoxy)benzene, 1,3-bis(4-aminophenoxy)benzene, 1,3-bis(3-aminophenoxy)benzene, 1,3-bis(4-aminophenoxy)-2,2-dimethylpropane, and 4,4'-diaminobenzophenone.

Among them, 4,4'-diaminodiphenyl ether and p-phenylenediamine are preferable.

(Tetracarboxylic Dianhydride)

Any tetracarboxylic dianhydride may be used with any specific limitation as the tetracarboxylic dianhydride for the synthesis of the heat resistant resin A in accordance with the invention and includes for example 3,3',4,4'-biphenyltetracarboxylic dianhydride, 2,2',3,3'-biphenyltetracarboxylic dianhydride, 3,3',4,4'-benzophenonetetracarboxylic dianhydride, 2,2',3,3'-benzophenonetetracarboxylic dianhydride, 4,4'-oxydiphthalic dianhydride, 2,2-bis(2,3-dicarboxyphenyl)hexafluoropropane dianhydride, 2,2-bis(3,4-dicarboxyphenyl)hexafluoropropane dianhydride (6FDA), bis(2,3-dicarboxyphenyl)methane dianhydride, bis(3,4-dicarboxyphenyl)methane dianhydride, bis(2,3-dicarboxyphenyl)sulfone dianhydride, bis(3,4-dicarboxyphenyl)sulfone dianhydride, pyromellitic dianhydride, and ethylene glycol bistrimellitic dianhydride. These may be used singly or in combination of two or more thereof.

Preferable tetracarboxylic anhydride includes for example 3,3',4,4'-biphenyltetracarboxylic dianhydride, 4,4'-oxydiphthalic dianhydride, 2,2-bis(3,4-dicarboxyphenyl)hexafluoropropane dianhydride (6FDA), and pyromellitic dianhydride.

Preferable examples of the heat resistant resin A include resins with a structure from the reaction between diamine compounds represented by the formulas (1) to (4) and a tetracarboxylic dianhydride.

Hereinbelow, Ar represents a structure with at least one aromatic ring and preferably with 6 to 30 carbon atoms and includes for example benzene ring, biphenyl and diphenyl ether.

a to h are the same as in the formulas (1) to (4).

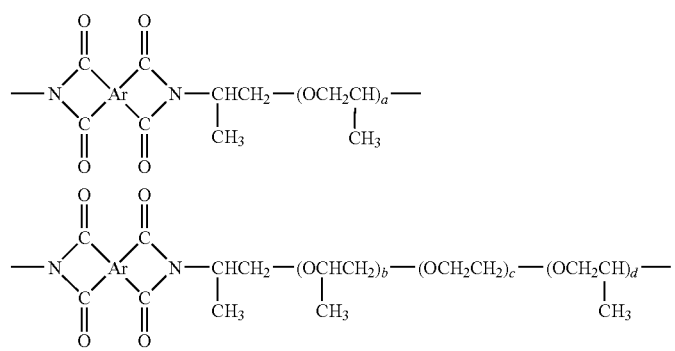

-continued

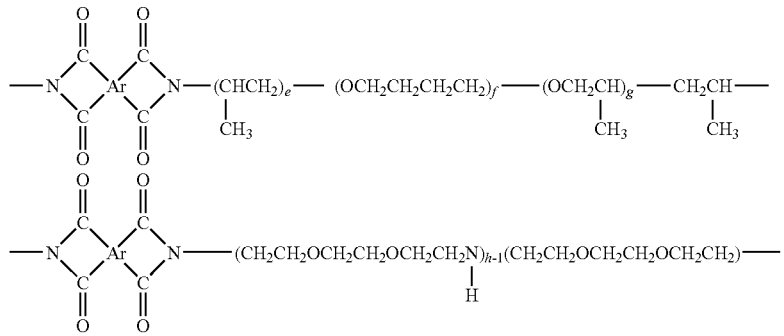

(Preparation of Heat Resistant Resin A)

The heat resistant resin A of the invention can be obtained by the reaction of the PE diamine compound with tetracarboxylic dianhydride, generally in a solvent.

The PE diamine compound may be blended up to an amount equal to that of tetracarboxylic dianhydride in a stoichiometric way. Preferably, however, the PE diamine compound is at preferably 5 to 60%, more preferably 5 to 30% of the stoichiometrically equal amount. In this case, other diamine compound such as aliphatic diamine and aromatic diamine as described above may be used in combination as the diamine component.

The total amount of the PE diamine compound and other diamine compounds is generally a stoichiometrically equal amount to that of tetracarboxylic dianhydride and may satisfactorily be an excess such as 100 to 500% of the stoichiometrically equal amount.

The heat resistant resin A of the invention preferably contains the structure unit derived from the reaction of the PE diamine compound with tetracarboxylic dianhydride, at preferably 10 to 80% by mass, more preferably 20 to 50% by mass of the total mass after drying.

The solvent for use in the reaction includes organic solvents such as N,N-dimethylacetamide, N-methyl-2-pyrrolidone and N,N-dimethylformamide and is preferably N-methyl-2-pyrrolidone. So as to adjust the solubility of the raw materials and the resin, additionally, non-polar solvents such as toluene and xylene can appropriately be mixed and used.

The concentration of the solutes in the reaction solution is generally 5 to 50% by mass, while the reaction temperature is generally ambient temperature (for example, 23° C.) to 220° C. and the reaction time is generally one to 10 hours, preferably 3 to 6 hours.

The thermoresistance of the heat resistant resin A obtained by the method can be improved more by thermally treating the heat resistant resin A at high temperature, preferably in inert atmosphere. The conditions for the thermal treatment are the same as the following conditions for heating treatment in producing the cleaning substrate of a substrate processing equipment.

(Production of the Cleaning Substrate of a Substrate Processing Equipment)

The cleaning substrate of a substrate processing equipment in accordance with the invention can be obtained by coating the heat resistant resin on a substrate, subsequently drying and eliminating the solvent, and thermally treating the substrate, preferably at high temperature.

The cleaning layer comprising the heat resistant resin A may contain other resins and additives other than the heat resistant resin A, at preferably 50% by mass or less, more preferably 10% by mass or less of the total mass of the cleaning layer.

Using the spin-coat process and the spray process as the coating method, the heat resistant resin A is directly coated on an appropriate substrate such as silicone wafer. Using the comma coat process, the fountain process and the gravure process, otherwise, the heat resistant resin A may be coated on a PET film or a polyimide film, which may then be transferred or attached on an appropriate substrate such as silicone wafer.

Further, the temperature for the heating treatment at high temperature after drying the solvent is satisfactorily 200° C. or more and preferably 250 to 350° C., while the time for the treatment is generally 10 minutes to 5 hours, preferably 30 minutes to 2 hours. So as to prevent the oxidation and deterioration of the resin, the resin is desirably treated under heating in inert atmosphere such as in nitrogen atmosphere and in vacuum. The heat resistance can be more improved via the treatment under heating, while the volatile components remaining in the resin can completely be removed.

The substrate for mounting the cleaning layer thereon includes but is not specifically limited to various types of substrates in a manner dependent on the type of a substrate processing equipment, from which extraneous matters are to be removed. Specifically, the substrate includes for example flat panel display substrates such as semiconductor wafer, LCD, and PDP, and other substrates such as substrates for compact disk and MR head.

The cleaning layer may satisfactorily be arranged on at least one of the faces of the substrate. The cleaning layer may also be arranged on both the faces thereof. Additionally, the cleaning layer may satisfactorily be arranged wholly or only partially thereon, such as on the edge face.

The thickness of the cleaning layer (after drying) is generally 1 to 50 μm, preferably 5 to 20 μm. When the thickness is too large, the vacuum degree of the apparatus may sometimes be reduced due to absorbed water. When the thickness is too small, the cleaning ability may sometimes be deteriorated.

The substrate processing equipment by which dusting is to be done in accordance with the invention includes for example but is not specifically limited to exposure apparatus, resist coating apparatus, development apparatus, ashing apparatus, dry etching apparatus, ion injection apparatus, PVD apparatus, CVD apparatus, appearance testing apparatus and wafer prober.

The cleaning layer with a storage modulus (1 Hz) at 20° C. to 150° C. being $5\times10^7$ Pa to $1\times10^9$ Pa can thus be formed, so that the resulting cleaning layer can get a better cleaning ability.

Additionally, the cleaning layer can get a tensile elastic modulus at ambient temperature (for example, 23° C.) being 1.5 GPa or less. The tensile elastic modulus is preferably 1.5 GPa or less, more preferably 0.1 to 0.8 GPa. Owing to such tensile elastic modulus, the resulting cleaning layer can get a more excellent dust proofing profile. When the tensile elastic modulus is less than 0.1 GPa, the cleaning layer eventually adheres to the contact face of the substrate processing equipment, so that occasionally no transfer can occur.

In accordance with the invention, the substrate processing equipment from which dust is eliminated by the method described above can be provided.

EXAMPLES

Hereinafter, the present invention will be described more specifically with reference to Examples, however, the present invention is not limited to these Examples.

(Storage Modulus)

Samples in a size of 5.0×22.6 mm were measured at a frequency of 1 Hz, a distortion of 0.3% and a temperature elevation rate of 10° C./minute, using ah apparatus for measuring viscoelasticity, namely RS-11 (manufactured by Rheometric Scientific Inc.).

(Tensile Elastic Modulus)

A method according to the test method JIS K7127 was used. The temperature for the measurement was 23° C.

(Cleaning Ability)

Cleaning ability was assessed, using the liner film peel-off apparatus for producing cleaning sheet (manufactured by Nittoh Seiki; HR300CW) (apparatus A). First, 20 aluminium pieces, each preliminarily cut into a size of 1 mm×1 mm were arranged on the chuck table of the apparatus. Then, the cleaning layer side of a cleaning substrate was transferred as a dummy to the apparatus A and then vacuum adsorbed on the chuck table (0.5 kg/cm²), to allow the cleaning layer and the chuck table part in contact to the layer to adhere strongly to each other. Subsequently, vacuum adsorption was released, to remove the cleaning substrate from the chuck table. Just then, the dust proofing ratio was measured on the basis of the number of the aluminium pieces remaining on the chuck table. Measurement was done triplicately, to calculate the mean.

(Transferability)

In the same manner, transfer was done with the apparatus on the chuck table, for vacuum adsorption. After vacuum was released, the peel-off capability of the cleaning member (CW) from the chuck table (CT) with a lift pin was assessed in 5 grades. When the transferability index is 3 or more, the peel-off can be done.

Transferability index (satisfactory level at 3 or more)

5: very stable (equivalent to Si wafer)

4: CW is more or less shaky during transfer from CT, involving very low peel-off noise.

3: CW is more or less shaky during transfer from CT, involving low peel-off noise.

2: CW is shaky during transfer from CT, involving rather large peel-off noise.

1: CW is highly shaky during transfer from CT, involving very large peel-off noise.

(Time Required for Achieving Vacuum)

As the time required for achieving vacuum, a time period required for resuming the initial vacuum degree $1\times10^{-9}$ Torr ($1.33\times10^{-7}$ Pa) was measured while the temperature was kept at 50° C., when a cleaning transfer member of 1 cm² was charged in a mass analyzer of temperature elevation and release type (manufactured by Electron Science; EMD-WA1000S). Herein, the conditions for the measurement were as follows: the temperature in the inside of the chamber was kept at 50° C.; the sample size was 1 cm²; and the initial vacuum degree was $3\times10^{-10}$ Torr ($4.0\times10^{-8}$ Pa) After the sample was charged, the time required for the vacuum degree to resume $1\times10^{-9}$ Torr ($1.33\times10^{-7}$ Pa) was determined.

When the time is short, preferably, the time has smaller influences on the production in vacuum.

Example 1

32.2 g of polyetherdiamine [manufactured by Sun Technochemical; XTJ-502 (ED-2003)] and 9.4 g of p-phenylenediamine were dissolved in 286.3 g of N-methyl-2-pyrrolidone (NMP). Then, 30 g of 3,3,4,4-biphenyltetracarboxylic dianhydride (abbreviated as BPDA hereinafter) described below was added for reaction. The resulting cooled resin solution was coated on the mirror face of an 8-inch silicone wafer and a glass plate with a spin coater, for drying at 90° C. for 20 minutes. This was thermally treated at 280° C. in nitrogen atmosphere for 2 hours, to form a heat resistant resin film of a thickness of 20 μm.

BPDA:

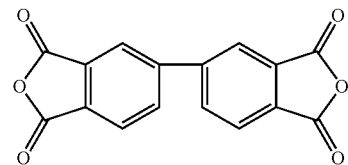

Example 2

32.3 g of polyetherdiamine [manufactured by Sun Technochemical; XTJ-500 (ED-600)] and 12.6 g of 4,4'-diaminodiphenyl ether were dissolved in 279.9 g of NMP. Then, 25 g of pyromellitic dianhydride (abbreviated as PMDA hereinafter) described below was added for reaction. The resulting cooled resin solution was coated on the mirror face of an 8-inch silicone wafer and a glass plate with a spin coater, for drying at 90° C. for 20 minutes. This was thermally treated at 280° C. in nitrogen atmosphere for 2 hours, to form a heat resistant resin film of a thickness of 20 μm.

PMDA:

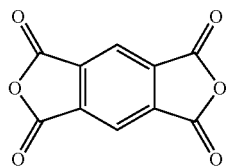

Example 3

29.0 g of polyetherdiamine [manufactured by Sun Technochemical; XTJ-502 (ED-2003)] and 15.6 g of 4,4'-diaminodiphenyl ether were dissolved in 258.2 g of NMP. Then, 20 g of PMDA was added for reaction. The resulting cooled resin solution was coated on the mirror face of an 8-inch silicone wafer and a glass plate with a spin coater, for drying at 90° C. for 20 minutes. This was thermally treated at 280° C. in nitrogen atmosphere for 2 hours, to form a heat resistant resin film of a thickness of 20 μm.

Example 4

44.0 g of polyetherdiamine [manufactured by Sun Technochemical; XTJ-510 (D4000)] and 25.3 g of 4,4'-diaminodiphenyl ether were dissolved in 397.4 g of NMP. Then, 30 g of PMDA was added for reaction. The resulting cooled resin solution was coated on the mirror face of an 8-inch silicone wafer and a glass plate with a spin coater, for drying at 90° C. for 20 minutes. This was thermally treated at 280° C. in nitrogen atmosphere for 2 hours, to form a heat resistant resin film of a thickness of 20 μm.

Example 5

40.7 g of polyetherdiamine (manufactured by Sun Technochemical; XTJ-542) and 10.1 g of 4,4'-diaminodiphenyl ether were dissolved in 283.4 g of NMP. Then, 20.0 g of PMDA was added for reaction. The resulting cooled resin solution was coated on the mirror face of an 8-inch silicone wafer and a glass plate with a spin coater, for drying at 90° C. for 20 minutes. This was thermally treated at 280° C. in nitrogen atmosphere for 2 hours, to form a heat resistant resin film of a thickness of 20 μm.

The polyetherdiamine types (manufactured by Sun Technochemical) used in Examples 1 to 5 were as follows;

XTJ-500 (ED-600): a compound of the formula (2), where $c=9.0$; $b+c+d=3.6$;

XTJ-502 (ED-2003): a compound of the formula (2), where $c=38.7$; $b+d=6$;

XTJ-510 (D4000): a compound of the formula (1), where $a=68$;

XTJ-542: a compound of the formula (3), where $e+g=6.0$; $f=9.0$;

Concerning the cleaning ability, the time required for achieving vacuum and the transferability, the 8-inch silicone wafers with the heat resistant resin films formed thereon as prepared in Examples 1 to 5 were assessed by the aforementioned methods, while the heat resistant resin films were designated as dust proofing face. The heat resistant resin films formed on the glass plates were peeled off from the glass plates, to measure the storage modulus and tensile elastic modulus thereof according to the methods described above.

Comparative Example 1

Without coating the resin on the 8-inch silicone wafer, the mirror face was used as the adhering face, to assess the cleaning ability, the time required for achieving vacuum and the transferability.

Comparative Example 2

30.0 g of ethylene-1,2-bistrimellitate tetracarboxylic dianhydride (abbreviated as TMEG hereinafter) was mixed and reacted with 65.8 g of diamine (amine equivalent of 900 and acrylonitrile content of 18%) of the following structure and 15.0 g of 2,2'-bis[4-(4-aminophenoxy)phenyl]propane (abbreviated as BAPP hereinafter) in 110 g of N-methyl-2-pyrrolidone (abbreviated as NMP hereinafter) at 120° C. in nitrogen atmosphere.

The resulting cooled resin solution was coated on the mirror face of an 8-inch silicone wafer and a glass plate with a spin coater, for drying at 90° C. for 20 minutes, This was thermally treated at 280° C. in nitrogen atmosphere for 2 hours, to form a heat resistant resin film of a thickness of 20 μm.

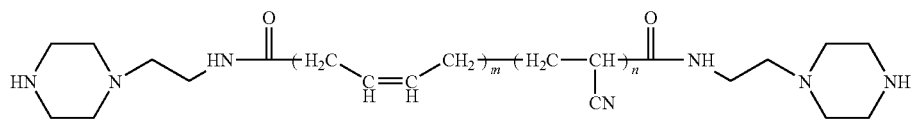

Comparative Example 3

200 parts of polyethylene glycol 200 dimethacrylate (manufactured by Shin-nakamura Chemical Co., Ltd.; NK ester 4G under trade name), 3 parts of a polyisocyanate compound (manufactured by Nippon Polyurethane Industry Co., Ltd.; Coronate L under trade name), 2 parts of an epoxy-series compound (manufactured by Mitsubishi Gas Chemical Company Inc.; Tetrad C under trade name) and 3 parts of benzyldimethyl ketal as a photopolymerization initiator (manufactured by Chiba Specialty Chemical; Irugacure-651 under trade name) were homogenously mixed with 100 parts of an acryl polymer (mass average molecular weight of 700,000) obtained from a monomer mix solution of 75 parts of 2-ethylhexyl acrylate, 20 parts of methyl acrylate and 5 parts of acrylic acid, to prepare an adhesive solution A of UV setting type.

Alternatively, 73 parts of 2-ethylhexyl acrylate, 10 parts of n-butyl acrylate, 15 parts of N,N-dimethylacrylamide, 5 parts of acrylic acid, 0.15 part of 2,2'-azobisisobutyronitrile as, a polymerization initiator and 100 parts of ethyl acetate were blended to a total of 200 g and then charged in a 500-ml three-necked flask reactor with a thermometer, an agitator, a nitrogen inlet and a reflux condenser, for agitation under the purge of nitrogen gas for about one hour, to substitute the air inside with nitrogen. Subsequently, the inner temperature was adjusted to 58° C. The inside was kept at that state for about 4 hours for polymerization, to obtain an adhesive polymer solution. 3 parts of a polyisocyanate compound (manufactured by Nippon Polyurethane Industry Co., Ltd.; Coronate L under trade name) were homogenously mixed with 100 parts of the adhesive polymer solution, to obtain the adhesive solution A.

One face of a continuous polyester film (manufactured by Mitsubishi Polyester Film, GmbH; MRF50N100 under trade name; a thickness of 50 μm and a width of 250 mm) was treated with a silicone-series release agent. The adhesive solution A was coated on the silicone release-treated face of the continuous polyester film to a dry thickness of 5 j. A continuous ethylene acetate vinyl copolymer was overlaid on the adhesive layer (to a thickness of 100 μm and a width of 250 mm). Further, the adhesive solution A of UV setting type was coated an the film to a dry thickness of 5 μm, to arrange an adhesive layer as the cleaning layer. The silicone release-treated face of the continuous polyester film (manufactured by Mitsubishi Polyester Film, GmbH; MRF50N100 under trade name; a thickness of 50 μm and a width of 250 mm) after the treatment of one face thereof with a silicone-series release agent was attached onto the surface, to prepare a laminate sheet A.

A cleaning sheet A with a UV-set cleaning layer was obtained by allowing ultraviolet ray of a 365-nm wavelength at the center to irradiate the laminate sheet A at an integral dose of 1,000 mJ/cm$^2$.

Peeling off the general protective film on the side of the adhesive layer on the cleaning sheet A and attaching the film on the mirror face of an 8-inch silicon wafer, a cleaning transfer member A was prepared.

Comparative Example 4

27.5 g of 4,4'-diaminophenyl ether was dissolved in 230.2 g of NMP. Then, 30.0 g of PMDA was added for reaction. The resulting cooled resin solution was coated on the mirror face of an 8-inch silicone wafer and a glass plate with a spin coater, for drying at 90° C. for 20 minutes. This was thermally treated at 280° C. in nitrogen atmosphere for 2 hours, to form a heat resistant resin film of a thickness of 20 μm.

Concerning the cleaning ability, the time required for achieving vacuum and the transferability, the 8-inch silicone wafers with the heat resistant resin films formed thereon as prepared in Comparative Examples 2 to 4 were assessed by the aforementioned methods, while the heat resistant resin films were designated as dust proofing face.

The heat resistant resin films formed on the glass plates as prepared in Comparative Examples 2 and 4 and the cleaning layer set with ultraviolet ray on the cleaning sheet A were measured of the storage modulus and tensile elastic modulus thereof according to the methods described above.

The results of the assessment about Examples 1 to 5 and Comparative Examples 1 to 4 are shown in Table 1.

TABLE 1

|  | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|
| Storage modulus (20° C.) (Pa) | $8.9 \times 10^8$ | $2.0 \times 10^8$ | $3.7 \times 10^8$ | $4.5 \times 10^8$ | $3.6 \times 10^8$ | — | $1.0 \times 10^9$ | $1.3 \times 10^9$ | $2.8 \times 10^9$ |
| Storage modulus (100° C.) (Pa) | $4.0 \times 10^8$ | $8.5 \times 10^7$ | $2.8 \times 10^8$ | $2.9 \times 10^8$ | $1.3 \times 10^8$ | — | $3.2 \times 10^7$ | $3.2 \times 10^7$ | $2.4 \times 10^9$ |
| Storage modulus (150° C.) (Pa) | $3.0 \times 10^8$ | $5.5 \times 10^7$ | $1.6 \times 10^8$ | $2.5 \times 10^8$ | $1.0 \times 10^8$ | — | $1.5 \times 10^7$ | $1.8 \times 10^6$ | $2.1 \times 10^9$ |
| Tensile elastic modulus (GPa) | 0.4 | 0.1 | 0.2 | 0.2 | 0.2 | — | 0.5 | 0.5 | 1.5 |
| Dust proofing ratio (20° C.) (%) | 100 | 100 | 100 | 100 | 100 | 50 | 90 | 80 | 70 |
| Dust proofing ratio (150° C.) (%) | 100 | 100 | 100 | 100 | 100 | 50 | — | — | 70 |
| Time required for achieving vacuum (minutes) | 3.6 | 3.4 | 3.9 | 3.2 | 3.9 | 3.0 | 3.6 | 3.5 | 3.3 |
| Transferability (20° C.) | 4 | 4 | 4 | 4 | 4 | 5 | 4 | 4 | 5 |
| Transferability (150° C.) | 4 | 3 | 4 | 4 | 4 | 5 | 2 | 1 | 5 |

While the invention has been described in detail and with reference to specific embodiments thereof, it will be apparent to one skilled in the art that various changes and modifications can be made therein without departing from the scope thereof.

This application is based on Japanese patent application No. 2004-304027 filed on Oct. 19, 2004, and Japanese patent application No. 2005-297735 filed on Oct. 12, 2005, the entire contents thereof being hereby incorporated by reference.

What is claimed is:

1. A cleaning substrate of a substrate processing equipment, which comprises:
    a substrate, and
    a cleaning layer comprising a heat resistant resin with a storage modulus (1 Hz) at 20° C. up to 150° C. being $5 \times 10^7$ Pa to $1 \times 10^9$ Pa on at least one face of the substrate.

2. The cleaning substrate of a substrate processing equipment according to claim 1, wherein the heat resistant resin is a heat resistant resin obtained by polymerizing together tetracarboxylic dianhydride and a compound at least containing a polyether structure and having at least two terminal amine structures as a diamine component.

3. The cleaning substrate of a substrate processing equipment according to claim 2, wherein the compound containing a polyether structure and having at least two terminal amine structures is a compound represented by the formula (1):

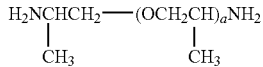

(1)

wherein a represents an integer of 2 or more.

4. The cleaning substrate of a substrate processing equipment according to claim 2, where the heat resistant resin is a heat resistant resin having a structure unit represented by the following formula (R1):

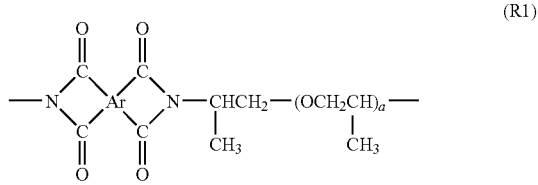

(R1)

wherein a represents an integer of 2 or more and Ar represents a structure containing at least one aromatic ring.

5. The cleaning substrate of a substrate processing equipment according to claim 2, wherein the compound containing a polyether structure and having at least two terminal amine structures is a compound represented by the formula (2):

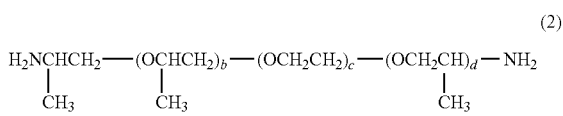

(2)

wherein b, c and d each independently represents an integer of 0 or more, provided that b+c+d is 2 or more.

6. The cleaning substrate of a substrate processing equipment according to claim 2, wherein the heat resistant resin is a heat resistant resin having a structure unit represented by the formula (R2):

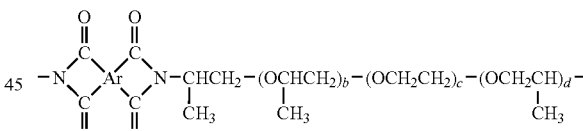

(R2)

wherein b, c and d each independently represents an integer of 0 or more, provided that b+c+d is 2 or more and Ar represents a structure containing at least one aromatic ring.

7. The cleaning substrate of a substrate processing equipment according to claim 2, wherein the compound containing a polyether structure and having at least two terminal amine structures is a compound represented by the formula (3):

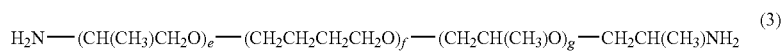

(3)

wherein e, f and g each independently represents an integer of 0 or more, provided that e+f+g is 2 or more.

8. The cleaning substrate of a substrate processing equipment according to claim 2, wherein the heat resistant resin is a heat resistant resin with a structure unit represented by the formula (R3):

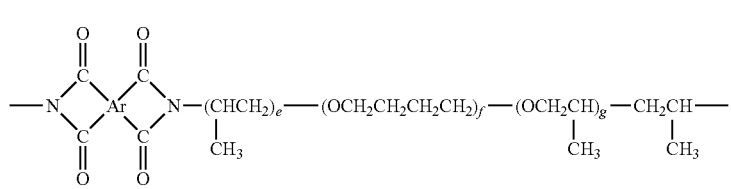
(R3)

wherein e, f and g each independently represents an integer of 0 or more, provided that e+f+g is 2 or more and Ar represents a structure containing at least one aromatic ring.

9. The cleaning substrate of a substrate processing equipment according to claim 2, wherein the compound containing a polyether structure and having at least two terminal amine structures is a compound represented by the formula (4):

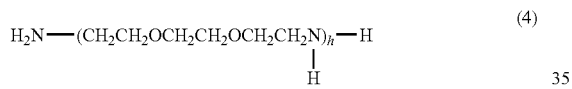
(4)

wherein h represents an integer of 1 or more.

10. The cleaning substrate of a substrate processing equipment according to claim 2, wherein the heat resistant resin is a heat resistant resin having a structure unit represented by the formula (R4):

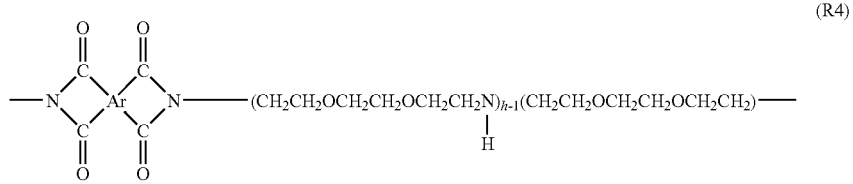
(R4)

wherein h represents an integer of 1 or more and Ar represents a structure containing at least one aromatic ring.

11. A method for dusting the surface of a substrate processing equipment, which comprises putting the resin face of a cleaning substrate according to any one of claims 1 to 10 in contact to the surface of the substrate processing equipment.

* * * * *